United States Patent
Fukazawa et al.

(10) Patent No.: US 12,275,646 B1
(45) Date of Patent: Apr. 15, 2025

(54) NEGATIVE THERMAL EXPANSION MATERIAL, METHOD FOR PRODUCING THE SAME, AND COMPOSITE MATERIAL

(71) Applicant: NIPPON CHEMICAL INDUSTRIAL CO., LTD., Tokyo (JP)

(72) Inventors: Junya Fukazawa, Tokyo (JP); Takuma Kato, Tokyo (JP); Toru Hata, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 18/840,630

(22) PCT Filed: Feb. 22, 2023

(86) PCT No.: PCT/JP2023/006528
§ 371 (c)(1),
(2) Date: Aug. 22, 2024

(87) PCT Pub. No.: WO2023/163058
PCT Pub. Date: Aug. 31, 2023

(30) Foreign Application Priority Data

Feb. 28, 2022 (JP) ................. 2022-029283
Oct. 6, 2022 (JP) ................. 2022-161760

(51) Int. Cl.
*C01G 31/00* (2006.01)
(52) U.S. Cl.
CPC ........ *C01G 31/006* (2013.01); *C01P 2002/72* (2013.01); *C01P 2004/61* (2013.01); *C01P 2004/62* (2013.01); *C01P 2006/12* (2013.01); *C01P 2006/32* (2013.01)
(58) Field of Classification Search
None
See application file for complete search history.

(56) References Cited

FOREIGN PATENT DOCUMENTS

| | | |
|---|---|---|
| CN | 108101108 A | 6/2018 |
| CN | 114315351 A | 4/2022 |
| CN | 112390642 B | 1/2023 |
| JP | 2005-035840 A | 2/2005 |
| JP | 2015-010006 A | 1/2015 |
| JP | 2018-002577 A | 1/2018 |
| JP | 2019-210198 A | 12/2019 |

OTHER PUBLICATIONS

Zhang, Niu et al., "Tailored thermal expansion and electrical properties of α-Cu2V2O7/Al", Ceramics International, 2016, vol. 42, pp. 17004-17008. (5 pages).

(Continued)

*Primary Examiner* — Colin W. Slifka
(74) *Attorney, Agent, or Firm* — WHDA, LLP

(57) ABSTRACT

An object of the present invention is to provide a negative thermal expansion material having better negative thermal expansion characteristics. The present invention is a negative thermal expansion material, comprising a copper vanadium composite oxide dissolving Li atoms and represented by the following general formula (1):$(Cu_xM_y)(V_aP_b)O_t$. In the general formula (1), M represents a metallic element with an atomic number of 11 or more other than Cu and V, $1.60 \leq x \leq 2.40$, $0.00 \leq y \leq 0.40$, $1.60 \leq a \leq 2.40$, $0.00 \leq b \leq 0.40$, $5.00 \leq t \leq 9.00$, $1.60 \leq x+y \leq 2.40$, and $1.60 \leq a+b \leq 2.40$.

16 Claims, 2 Drawing Sheets

(56) References Cited

OTHER PUBLICATIONS

Grams, Christoph P. et al., "Observation of chiral solitons in LiCuVO4", communications physics, 2022, 5, 37, pp. 1-7, cited in ISR, JP Notice of Reasons for Refusal and JP Decision to Grant a Patent.(7 pages).
Grams, Christoph P. et al., "Evidence for polarized nanoregions from the domain dynamics in mutiferroic LiCuVO4", Scientific Reports, 2019, 9, 4391, pp. 1-9, cited in ISR, JP Notice of Reasons for Refusal and JP Decision to Grant a Patent.(9 pages).
International Search Report dated May 16, 2023, issued in counterpart International Application No. PCT/JP2023/006528, with English translation. (5 pages).
Notice of Reasons for Refusal dated Nov. 14, 2023, issued in counterpart JP Patent Application No. 2022-161760, with English translation. (8 pages).
Decision to Grant a Patent dated Jan. 16, 2024, issued in counterpart JP Patent Application No. 2022-161760, with English translation. (5 pages).

NEGATIVE THERMAL EXPANSION MATERIAL, METHOD FOR PRODUCING THE SAME, AND COMPOSITE MATERIAL

TECHNICAL FIELD

The present invention relates to a negative thermal expansion material, which contracts with an increase in temperature, a method for producing the negative thermal expansion material, and a composite material containing the negative thermal expansion material.

If the temperature rises, many substances increase in length or volume due to thermal expansion. Meanwhile, materials that contract and exhibit negative thermal expansion upon heating (hereinafter occasionally referred to as "negative thermal expansion materials") are also known.

It is known that the use of materials exhibiting negative thermal expansion with other materials enables suppressing the thermal expansion change of the materials with temperature variation.

As materials exhibiting negative thermal expansion, for example, β-eucryptite, zirconium tungstate ($ZrW_2O_8$), zirconium phosphate tungstate ($Zr_2WO_4(PO_4)_2$), $Zn_xCd_{1-x}(CN)_2$, manganese nitride, and bismuth-nickel-iron oxide are known.

It is known that the linear coefficient of expansion of zirconium phosphate tungstate is −3.4 to −3.0 ppm/° C. in the temperature range of 0 to 400° C., and zirconium phosphate tungstate is high in negative thermal expandability. The combined use of the zirconium phosphate tungstate and a material exhibiting positive thermal expansion (hereinafter occasionally referred to as a "positive thermal expansion material") enables producing a low thermal expansion material (for example, refer to Patent Literatures 1 and 2). The combined use of a polymer such as a resin that is a positive thermal expansion material and a negative thermal expansion material has been proposed (for example, refer to Patent Literature 3).

The following Non Patent Literature 1 discloses that a copper vanadium composite oxide, α-$Cu_2V_2O_7$, has a linear coefficient of expansion of −5 to −6 ppm/° C. in the range of room temperature to 200° C. Methods for further improving negative thermal expansion characteristics by partially substituting the Cu atoms of the copper vanadium composite oxide with atoms of at least one element selected from Zn, Ga, and Fe or by partially substituting the V atoms with P atoms have also been proposed (Patent Literatures 4 to 5).

CITATION LIST

Patent Literature

Patent Literature 1

Japanese Patent Laid Open No. 2005-35840 Patent Literature 2

Japanese Patent Laid Open No. 2015-10006 Patent Literature 3

Japanese Patent Laid Open No. 2018-2577 Patent Literature 4

Japanese Patent Laid Open No. 2019-210198 Patent Literature 5

Chinese Patent No. CN112390642

Non Patent Literature

Non Patent Literature 1

Ceramics International, Vol.42, p17004-17008(2016)

SUMMARY OF INVENTION

Technical Problem

The copper vanadium composite oxide of Non Patent Literature 1 has a low linear coefficient of expansion as compared with zirconium phosphate tungstate. Since the copper vanadium composite oxide can be produced from lower-price raw materials and industrially advantageously produced, and is better in water resistance, the copper vanadium composite oxide is however required to have further improved negative thermal expansion characteristics.

Accordingly, an object of the present invention is to provide a negative thermal expansion material having better negative thermal expansion characteristics.

Another object of the present invention is to provide the negative thermal expansion material by an industrially advantageous method.

Solution to Problem

The following present inventions can solve the above-mentioned problem.

That is, the present invention (1) provides a negative thermal expansion material, comprising a copper vanadium composite oxide dissolving Li atoms and represented by the following general formula (1):

$$(Cu_xM_y)(V_aP_b)O_t \tag{1}$$

wherein M represents a metallic element with an atomic number of 11 or more other than Cu and V, $1.60 \le x \le 2.40$, $0.00 \le y \le 0.40$, $1.60 \le a \le 2.40$, $0.00 \le b \le 0.40$, $5.00 \le t \le 9.00$, $1.60 \le x+y \le 2.40$, and $1.60 \le a+b \le 2.40$.

The present invention (2) provides a method for producing a negative thermal expansion material, comprising:

a step A1 of preparing a raw material-mixed solution in which an Li source, a Cu source, and a V source; and an M source and/or a P source to be mixed as needed are dissolved in a water solvent;

a step A2 of removing the water solvent from the raw material-mixed solution to prepare a reaction precursor; and a step A3 of firing the reaction precursor, wherein the negative thermal expansion material comprises a copper vanadium composite oxide dissolving Li atoms and represented by the following general formula (1a):

$$(Cu_xM_y)(V_aP_b)O_t \tag{1a}$$

wherein M represents a metallic element with an atomic number of 11 or more other than Cu and V, $1.60 \le x \le 2.40$, $0.00 \le y \le 0.40$, $1.60 \le a \le 2.40$, $0.00 \le b \le 0.40$, $5.00 \le t \le 9.00$, $1.60 \le x+y \le 2.40$, and $1.60 \le a+b \le 2.40$.

The present invention (3) provides a method for producing a negative thermal expansion material, comprising:

a step B1 of mixing an Li source, a Cu source, a V source, and a P source; and an M source to be mixed as needed to prepare a raw material mixture and a step B2 of firing the raw material mixture, wherein the negative thermal expansion material comprises a copper vanadium composite oxide dissolving Li atoms and represented by the following general formula (1a):

$$(Cu_xM_y)(V_aP_b)O_t \qquad (1a)$$

wherein M represents a metallic element with an atomic number of 11 or more other than Cu and V, $1.60 \leq x \leq 2.40$, $0 \leq y \leq 0.40$, $1.60 \leq a \leq 2.40$, $0.00 \leq b \leq 0.40$, $5.00 \leq t \leq 9.00$, $1.60 \leq x+y \leq 2.40$, and $1.60 \leq a+b \leq 2.40$, a molar ratio of Li to P(Li/P) in the negative thermal expansion material is from 0.70 to 1.30 in terms of atoms, and lithium metaphosphate is used as the Li source and the P source in the step B1.

Advantageous Effects of Invention

According to the present invention, a negative thermal expansion material having better negative thermal expansion characteristics can be provided.

DESCRIPTION OF EMBODIMENTS

Figure 1:
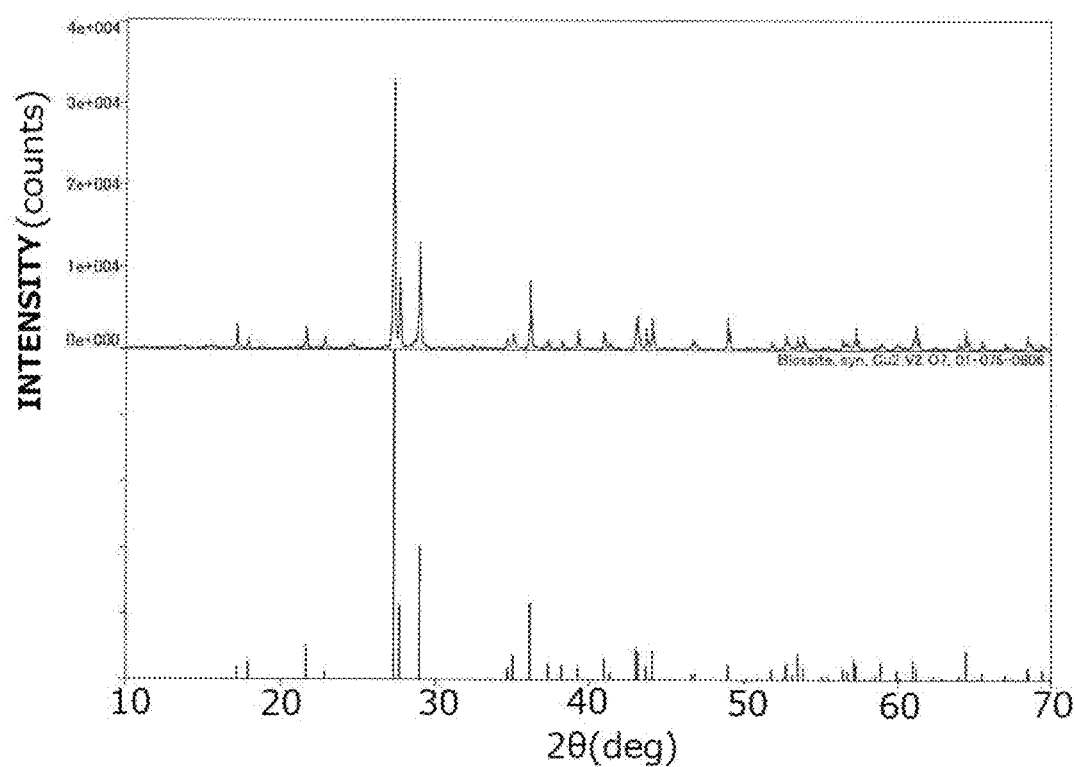
FIG. 1 is the X-ray diffraction pattern of a negative thermal expansion material sample obtained in Example 1.

Hereinafter, the present invention will be described based on preferable embodiments thereof.

The negative thermal expansion material of the present invention is characterized by comprising a copper vanadium composite oxide dissolving Li atoms and represented by the following general formula (1):

$$(Cu_xM_y)(V_aP_b)O_t \qquad (1)$$

wherein M represents a metallic element with an atomic number of 11 or more other than Cu and V, $1.60 \leq x \leq 2.40$, $0.00 \leq y \leq 0.40$, $1.60 \leq a \leq 2.40$, $0.00 \leq b \leq 0.40$, $5.00 \leq t \leq 9.00$, $1.60 \leq x+y \leq 2.40$, and $1.60 \leq a+b \leq 2.40$.

The copper vanadium composite oxide dissolving the Li atoms is the copper vanadium composite oxide represented by the following general formula (1):

$$(Cu_xM_y)(V_aP_b)O_t \qquad (1)$$

In the general formula (1), M is a metallic element to be incorporated as needed for improving the negative thermal expandability, adjusting the negative thermal characteristics, and improving the dispersibility in resin. M represents a metallic element with an atomic number of 11 or more other than Cu and V, and is preferably one or more selected from Zn, Ga, Fe, Mg, Co, Mn, Al, Ba, and Ca; still more preferably one selected from Zn, Ga, Fe, Mg, Co, Mn, Al, Ba, and Ca; and still more preferably one selected from Mg, Co, Mn, Al, and Ca.

In the general formula (1), $1.60 \leq x \leq 2.40$, preferably $1.70 \leq x \leq 2.30$, and more preferably $1.80 \leq x \leq 2.20$. If x is in the above-mentioned range, the negative thermal expansion characteristics are further enhanced.

In the general formula (1), $0.00 \leq y \leq 0.40$, preferably $0.00 \leq y \leq 0.35$, and more preferably $0.00 \leq y \leq 0.30$. If y is in the above-mentioned range, the negative thermal expansion characteristics are further enhanced.

In the general formula (1), $1.60 \leq a \leq 2.40$, preferably $1.50 \leq a \leq 2.30$, and more preferably $1.20 \leq a \leq 2.20$. If a is in the above-mentioned range, the negative thermal expansion characteristics are further enhanced.

In the general formula (1), $0.00 \leq b \leq 0.40$. In the present invention, preferably $0 \leq b \leq 0.40$, particularly preferably $0 \leq b \leq 0.35$, and more preferably $0.01 \leq b \leq 0.30$ in that a copper vanadium composite oxide in which the V atoms are partially substituted with the P atoms is better in negative thermal expandability.

In the general formula (1), $5.00 \leq t \leq 9.00$, preferably $6.00 \leq t \leq 8.00$, and more preferably $6.20 \leq t \leq 7.80$. If t is in the above-mentioned range, the negative thermal expansion characteristics are further enhanced.

In the general formula (1), $1.60 \leq x+y \leq 2.40$, preferably $1.70 \leq x+y \leq 2.30$, and more preferably $1.80 \leq x+y \leq 2.20$. If x+y is in the above-mentioned range, the negative thermal expansion characteristics are further enhanced.

In the general formula (1), $1.60 \leq a+b \leq 2.40$, preferably $1.70 \leq a+b \leq 2.30$, and more preferably $1.80 \leq a+b \leq 2.20$. If a+b is in the above-mentioned range, the negative thermal expansion characteristics are further enhanced.

In the negative thermal expansion material of the present invention, Li atoms are dissolved in the copper vanadium composite oxide represented by the general formula (1). That is, the negative thermal expansion material of the present invention comprises the copper vanadium composite oxide represented by the general formula (1), and the Li atoms are dissolved and contained in the copper vanadium composite oxide. In a common complex of a negative thermal expansion material and Li metal, the Li metal merely adheres to negative thermal expansion material particles strongly, unlike the present invention wherein Li atoms are dissolved inside of particles of the negative thermal expansion material. Since the negative thermal expansion material of the present invention is the copper vanadium composite oxide dissolving the Li atoms and represented by the general formula (1), the negative thermal expansion characteristics are improved as compared with a copper vanadium composite oxide not dissolving the Li atoms and having the same composition as represented by the general formula (1). That is, since the negative thermal expansion material of the present invention is the copper vanadium composite oxide dissolving the Li atoms and represented by the general formula (1), the coefficient of thermal expansion is reduced as compared with the copper vanadium composite oxide not dissolving the Li atoms and having the same composition as represented by the general formula (1).

The content of Li atoms in the negative thermal expansion material of the present invention is preferably 100 to 9000 ppm by mass, more preferably 200 to 8000 ppm by mass, and particularly preferably 300 to 7000 ppm by mass. If the content of Li atoms in the negative thermal expansion material is in the above-mentioned range, the negative thermal expansion material is preferable in that the negative thermal expansion material is a single phase confirmed by X-ray diffraction, and is better in negative thermal expansion characteristics. In the present invention, a solution prepared by acidolyzing the negative thermal expansion material is analyzed by the ICP emission method to determine the content of Li atoms in the negative thermal expansion material.

The BET specific surface area of the negative thermal expansion material of the present invention is, but not particularly limited to, preferably 0.05 to 50 m²/g, particularly preferably 0.1 to 10 m²/g, and still more preferably 0.1 to 5 m²/g. If the negative thermal expansion material is used as a filler for resin or glass, the BET specific surface area of the negative thermal expansion material in the above-mentioned range facilitates the handle thereof.

The average particle size of the negative thermal expansion material of the present invention is determined by scanning electron microscopy observation, and is, but not particularly limited to, preferably 0.1 to 100 μm and particularly preferably 0.3 to 80 μm. If the negative thermal expansion material is used as a filler for resin or glass, the average particle size of the negative thermal expansion material in the above-mentioned range facilitates the handle thereof. In the present invention, the arithmetic mean value of the sizes of 50 particles randomly sampled in the scanning electron microscopy observation at a magnification of 1000 was calculated as the average particle size of the negative thermal expansion material. At this time, the particle size of each particle means the length of the longest segment (the maximum length) among the line segments passing across a two-dimensional projection image of the particle.

The particle shape of the negative thermal expansion material of the present invention may be, but not particularly limited to, for example, spherical, granular, plate-like, scaly, whisker-like, rod-like, filamentous, or a crushed shape.

As long as the negative thermal expansion material of the present invention has a low coefficient of thermal expansion as compared with that of the copper vanadium composite oxide not dissolving Li atoms and having the same composition as represented by the general formula (1), the coefficient of thermal expansion of the negative thermal expansion material of the present invention is, but not limited to, preferably $-8.0 \times 10^{-6}$/K or less and more preferably $-10.0 \times 10^{-6}$/K or less, and the lower limit is, but not particularly limited to, around $-30.0 \times 10^{-6}$/K or more and preferably $-28.0 \times 10^{-6}$/K or more. The coefficient of thermal expansion of the negative thermal expansion material of the present invention is particularly preferably $-25.0 \times 10^{-6}$/K to $-8.0 \times 10^{-6}$/K in that the coefficient of the negative thermal expansion material easily offsets the positive expansion upon the combination of the negative thermal expansion material of the present invention with the positive thermal expansion material.

In the present invention, the coefficient of thermal expansion is determined by the following procedure. First, 1.0 g of the negative thermal expansion material sample is mixed with 0.05 g of a binder resin, and the entire amount thereof is filled into a metal mold with a diameter of 6 mm and subsequently molded with a hand press under a pressure of 0.5 t to manufacture a molding. This molding is fired at 700° C. in the atmosphere in an electric furnace for 4 hours to obtain a ceramic molding. The obtained ceramic molding is repeatedly measured twice with a thermomechanical measuring apparatus in a nitrogen atmosphere under a load of 10 g at a temperature range of 50 to 425° C. The coefficient of thermal expansion at 50 to 400° C. in the second repeated measurement is defined as the coefficient of thermal expansion. As the thermomechanical measuring apparatus, for example, TMA400SE available from NETZSCH Japan K.K. is usable. In the negative thermal expansion material of the present invention, the copper vanadium composite oxide represented by the general formula (1) basically includes the ziesite phase (β-phase) and the blossite phase (α-phase), and also includes a mixed phase thereof. The negative thermal expansion material of the present invention may be the ziesite phase (β-phase), the blossite phase (α-phase) or the mixed phase of the ziesite phase (β-phase) and the blossite phase (α-phase).

In the present invention, "copper vanadium composite oxide represented by the general formula (1) is single phase" means that the ziesite phase (β-phase) of the copper vanadium composite oxide represented by the general formula (1) is present alone, the blossite phase (α-phase) is present alone, or the ziesite phase (β-phase) and the blossite phase (α-phase) are present as a mixed phase, and means that other diffraction peaks than the diffraction peaks derived from the copper vanadium composite oxide represented by the general formula (1) are not detected by X-ray diffraction.

In the negative thermal expansion material of the present invention, upon the X-ray diffraction analysis of the negative thermal expansion material using CuKα line as a radiation source, diffraction peaks at around 25°, that is at 2θ=23.5 to 26.5°, are derived from the ziesite phase (β-phase), and diffraction peaks at around 27°, that is at 2θ=26.8 to 27.8°, are derived from the blossite phase (α-phase).

Although Examples 2 and 3 described later herein describe copper vanadium composite oxides dissolving the Li atoms at 1215 ppm by mass and having almost the same composition represented by $Cu_{2.00}(V_{1.94}P_{0.06})O_{7.00}$, the composite oxides have different linear coefficients of thermal expansion. Although the reason therefor is unknown, the present inventors believe that since the copper vanadium composite oxide of Example 2 has two phases, namely the ziesite phase and the blossite phase, and the copper vanadium composite oxide of Example 3 has a single phase of the ziesite phase, the difference in the linear coefficient of thermal expansion results from the difference in the crystal phase or in the content of the crystal phase.

The negative thermal expansion material of the present invention is industrially advantageously produced by the below-described method for producing a negative thermal expansion material of a first or second aspect.

The method for producing a negative thermal expansion material of the first aspect of the present invention is a method for producing a negative thermal expansion material comprising a copper vanadium composite oxide dissolving Li atoms and represented by the following general formula (1):

$$(Cu_xM_y)(V_aP_b)O_t \qquad (1)$$

wherein M represents a metallic element with an atomic number of 11 or more other than Cu and V, 1.60≤x≤2.40, 0.00≤y≤0.40, 1.60≤a≤2.40, 0.00≤b≤0.40, 5.00≤t≤9.00, 1.60≤x+y≤2.40, and 1.60≤a+b≤2.40.

The method is characterized by comprising: a step A1 of preparing a raw material-mixed solution in which an Li source, a Cu source, and a V source; and an M source and/or a P source to be mixed as needed are dissolved in a water solvent;

a step A2 of removing the water solvent from the raw material-mixed solution to prepare a reaction precursor; and a step A3 of firing the reaction precursor.

That is, the method for producing a negative thermal expansion material of the first aspect of the present invention is a method for producing the negative thermal expansion material of the present invention, and comprises the step A1, the step A2, and the step A3.

The copper vanadium composite oxide represented by the general formula (1) and related to the method for producing a negative thermal expansion material of the first aspect of the present invention is the same as the copper vanadium composite oxide represented by the general formula (1) and related to the negative thermal expansion material of the present invention.

The step A1 is a step of dissolving an Li source, a Cu source, and a V source; and an M source and/or a P source to be mixed as needed in a water solvent to prepare a raw material-mixed solution in which the Li source, the Cu source, and the V source; and the M source and/or the P source as needed are dissolved in the water solvent.

The water solvent related to the step A1 refers to a solvent containing water at more than 50% by mass, and may be a solvent consisting of only water or a mixed solvent of water and a hydrophilic organic solvent. The hydrophilic organic solvent can be dissolved in water at any ratio, and examples include ethanol and methanol.

As long as the Li source related to the step A1 can be dissolved in the water solvent, examples of the Li source include, but not particularly limited to, lithium hydroxide and lithium carbonate.

As long as the Cu source related to the step A1 can be dissolved in the water solvent, examples of the Cu source include, but not particularly limited to, copper salts of organic carboxylic acids such as copper gluconate, copper citrate, copper oxalate, copper acetate, and copper lactate; and copper salts of mineral acids.

As long as the V source related to the step A1 can be dissolved in the water solvent, examples of the V source include, but not particularly limited to, vanadic acid and sodium salt, potassium salt, and ammonium salt thereof; and vanadium salts of carboxylic acids.

Examples of the vanadium salts of the carboxylic acids include monocarboxylic acids such as formic acid, acetic acid, glycolic acid, lactic acid, and gluconic acid; dicarboxylic acids such as oxalic acid, maleic acid, malonic acid, malic acid, tartaric acid, and succinic acid; and carboxylic acids such as citric acid having three carboxyl groups. Among these, ammonium vanadate and vanadium gluconate are preferable from the viewpoint of obtaining an object containing impurities in a small amount.

If a vanadium salt of a carboxylic acid is used as the V source, vanadium pentoxide, a reducing agent, and a carboxylic acid are added to the water solvent, and the mixture is heat-treated at 60 to 100° C. to produce a vanadium salt of the carboxylic acid. This reaction solution is used as it is, the mixing of the Cu source; and the M source and/or the P source as needed enables obtaining the raw material-mixed solution.

The reducing agent is preferably a reducing sugar. Examples of the reducing sugar include glucose, fructose, lactose, maltose, and sucrose. Among these, lactose and sucrose are particularly preferable from the viewpoint that lactose and sucrose are highly reactive.

The amount of the reducing sugar added is preferably 0.7 to 3.0 and more preferably 0.8 to 2.0 in terms of the molar ratio of C in the reducing sugar to V in vanadium pentoxide (C/V) in that the reductive reaction can be performed efficiently. The amount of the carboxylic acid added is preferably 0.1 to 4.0 and more preferably 0.2 to 3.0 in terms of the molar ratio of the carboxylic acid to vanadium pentoxide in that a transparent vanadium solution can be obtained efficiently.

As long as the M source to be mixed as needed can be dissolved in the water solvent, examples of the M source include, but not particularly limited to, carboxylates and halides of the M element. Examples of the carboxylates of the M element include gluconates, citrates, and lactates.

If the M source is sparingly soluble or insoluble, the addition of a carboxylic acid such as citric acid, oxalic acid, or lactic acid that forms a chelate together with the M source to the water solvent enables dissolving the M source in the water solvent for use.

As long as the P source to be mixed as needed can be dissolved in the water solvent, the P source is not particularly limited. Phosphoric acid is preferably used.

In the preparation of the raw material-mixed solution related to the step A1, the mixing amounts of the Cu source and the V source; and the M source and/or the P source to be mixed as needed are preferably adjusted suitably so that the molar ratio between the Cu, V, M, and P atoms in the raw material-mixed solution corresponds to the composition of the copper vanadium composite oxide represented by the general formula (1). In the preparation of the raw material-mixed solution related to the step A1, the mixing amount of the Li source is preferably and suitably adjusted to preferably 100 to 9000 ppm by mass, more preferably 200 to 8000 ppm by mass, and particularly preferably 300 to 7000 ppm by mass based on the obtained negative thermal expansion material.

The total of the concentration of the V source and the concentration of the P source to be mixed as needed in the raw material-mixed solution (V source+P source) is preferably 1 to 40% by mass and more preferably 2 to 30% by mass in terms of oxides in that a homogeneous solution is easily prepared, and water is evaporated highly efficiently in the subsequent step.

The total of the concentration of the Cu source and the concentration of the M source to be mixed as needed in the raw material-mixed solution (Cu source+M source) is preferably 1 to 40% by mass and more preferably 2 to 30% by mass in terms of oxides in that a homogeneous solution is easily prepared, and water is evaporated highly efficiently in the subsequent step.

The concentration of the Li source in the raw material-mixed solution is preferably 0.001 to 0.3% by mass and more preferably 0.003 to 0.2% by mass in terms of oxide in that a homogeneous solution is easily prepared, and water is evaporated highly efficiently in the subsequent step.

The mixing order of the Li source, the Cu source, and the V source; and the M source and/or the P source to be mixed as needed is not particularly limited. The following preparation method is preferable from the viewpoint that a homogeneous solution is prepared. A solution in which the V source is dissolved in the water solvent (solution A), a solution in which the M source to be mixed as needed and the Cu source are dissolved in the water solvent (solution B), a solution in which the Li source is dissolved in the water solvent (solution C), and a solution in which the P source to be mixed as needed is dissolved in the water solvent (solution D) are individually prepared, and the solution A, the solution B, and the solution C; and the solution D to be mixed as needed are mixed to obtain the raw material-mixed solution.

The method for mixing the solution A, the solution B, and the solution C is not particularly limited. The solution B and the solution C are mixed with the solution A sequentially in that a homogeneous solution is easily obtained. If the solution D is mixed, the solution B, the solution D, and the solution C are mixed with the solution A sequentially in that a homogeneous solution is easily obtained.

The concentration of the V source in the solution A is preferably 1 to 40% by mass and more preferably 2 to 30% by mass in terms of oxide in that a homogeneous solution is easily prepared, and water is evaporated highly efficiently in the subsequent step.

To enhance the solubility of the V source, alkali may be added to the solution A, the temperature thereof may be raised, or both treatments may be performed.

To dissolve the M source to be mixed as needed and the Cu source in the water solvent, a carboxylic acid may be added to the solution B to dissolve the M source and/or the Cu source in the water solvent as carboxylate.

If the M source is mixed as needed, examples of the method for preparing the raw material-mixed solution include a method involving:

preparing a solution in which the Cu source is dissolved in the water solvent (solution B1) and a solution in which the M source is dissolved in the water solvent (solution B2) individually and (1) mixing the solution B1, the solution B2, and the solution C with the solution A sequentially or (2) mixing the solution B2, the solution B1, and the solution C with the solution A sequentially.

If the solution D is mixed as needed, examples of the method for preparing the raw material-mixed solution include a method involving (1) mixing the solution B1, the solution B2, the solution D and the solution C with the solution A sequentially or (2) mixing the solution B2, the solution B3, the solution D, and the solution C with the solution A sequentially.

The total of the concentration of the Cu source and the concentration of the M source to be mixed in the solution B(Cu source+M source) is preferably 1 to 40% by mass and more preferably 2 to 30% by mass in terms of oxides in that a homogeneous solution is easily prepared, and water is evaporated highly efficiently in the subsequent step.

The concentration of the Li source in the solution C is preferably 0.001 to 0.3% by mass and more preferably 0.003 to 0.2% by mass in terms of oxide in that a homogeneous solution is easily prepared, and water is evaporated highly efficiently in the subsequent step.

The concentration of the P source to be mixed as needed in the solution D is preferably 0.001 to 0.3% by mass and more preferably 0.003 to 0.2% by mass in terms of oxide in that a homogeneous solution is easily prepared, and water is evaporated highly efficiently in the subsequent step.

The step A2 is a step of heating the raw material-mixed solution prepared in the step A1 and removing the water solvent to prepare a reaction precursor.

In the step A2, for example, heating the raw material-mixed solution prepared in the step A1 with stirring enables removing the water solvent to prepare the reaction precursor as a paste or a solid. In the step A2, the entire amount of the water solvent may be removed to prepare the reaction precursor as a solid or to prepare the reaction precursor as a paste, containing a small amount of the water solvent. The paste refers to a considerably viscous state.

As long as the water solvent can be removed, in the step A2, the temperature for heating the raw material-mixed solution in which the raw materials are dissolved in the water solvent is preferably, but not particularly limited to, a temperature that enables keeping the solution boiling, and is usually preferably 90 to 120° C. and more preferably 100 to 120° C.

The step A2 is performed to obtain the reaction precursor.

The step A3 is a step of firing the reaction precursor obtained by the step A2 to obtain the negative thermal expansion material of the present invention.

The firing temperature in the step A3 is preferably 580 to 780° C. and more preferably 600 to 750° C. If the firing temperature falls below 580° C., the copper vanadium composite oxide represented by the above-mentioned general formula (1) tends to be insufficiently produced. If the firing temperature exceeds 780° C., the molten product sticking to the crucible tends to make it difficult to collect the product.

The firing time in the step A3 is not particularly limited, but the reaction is performed for sufficient time until the negative thermal expansion material of the present invention is produced. The production of the negative thermal expansion material of the present invention can be confirmed for example, by analyzing whether a single-phase copper vanadium composite oxide represented by the general formula (1) is obtained by X-ray diffraction. In the step A3, almost entire of the raw materials in the reaction precursor usually becomes the negative thermal expansion material comprising the copper vanadium composite oxide dissolving the Li atoms and represented by the above-mentioned general formula (1) within a firing time of 1 hour or more, preferably 2 to 20 hours. In the present invention, "the copper vanadium composite oxide represented by the general formula (1) is single phase" means that the ziesite phase (β-phase) of the copper vanadium composite oxide represented by the general formula (1) is present alone, the blossite phase (α-phase) is present alone, or the ziesite phase (β-phase) and the blossite phase (α-phase) are present as a mixed phase, and means that other diffraction peaks than the diffraction peaks derived from the copper vanadium composite oxide represented by the general formula (1) are not detected by X-ray diffraction.

The firing atmosphere in the step 3A is not particularly limited, and the second step may be performed in any of an inert gas atmosphere, a vacuum atmosphere, an oxidizing gas atmosphere, and the atmosphere.

In the step 3A, the reaction precursor may be fired once or multiple times if desired. For example, the object fired once may be pulverized, and the pulverized object may be further fired for uniforming the powder characteristics.

After the firing, the fired object is suitably cooled; and pulverized, disintegrated, and classified as needed to obtain the negative thermal expansion material of the present invention.

The method for producing a negative thermal expansion material of the second aspect of the present invention is a method for producing a negative thermal expansion material, comprising:

a step B1 of mixing an Li source, a Cu source, a V source, and a P source; and an M source to be mixed as needed to prepare a raw material mixture and a step B2 of firing the raw material mixture, wherein the negative thermal expansion material comprises a copper vanadium composite oxide dissolving Li atoms and represented by the following general formula (1a):

$$(Cu_xM_y)(V_aP_b)O_t \qquad (1a)$$

wherein M represents a metallic element with an atomic number of 11 or more other than Cu and V, $1.60 \leq x \leq 2.40$, $0 \leq y \leq 0.40$, $1.60 \leq a \leq 2.40$, $0.00 \leq b \leq 0.40$, $5.00 \leq t \leq 9.00$, $1.60 \leq x+y \leq 2.40$, and $1.60 \leq a+b \leq 2.40$, a molar ratio of Li to P(Li/P) in the negative thermal expansion material is from 0.70 to 1.30 in terms of atoms, and lithium metaphosphate is used as the Li source and the P source in the step B1. That is, the method for producing a negative thermal expansion material of the second aspect of the present invention is a method for producing a negative thermal expansion material wherein, in the general formula (1), $0 \leq b \leq 0.40$, preferably $0 \leq b \leq 0.35$, and more preferably $0.01 \leq b \leq 0.30$; and the molar ratio of Li to P(Li/P) is from 0.70 to 1.30 and preferably from 0.80 to 1.20 in terms of atoms among the negative thermal expansion materials of the present invention. The method comprises the step B1 and the step B2, wherein lithium metaphosphate is used as the Li source and the P source in the step B1.

The copper vanadium composite oxide represented by the general formula (1a) and related to the method for producing the negative thermal expansion material of the second aspect of the present invention is the same as the copper vanadium composite oxide represented by the general formula (1) and related to the negative thermal expansion material of the present invention except that, in the above-mentioned general formula (1), $0 \leq b \leq 0.40$, preferably $0 \leq b \leq 0.35$, and more preferably $0.01 \leq b \leq 0.30$. That is, the copper vanadium composite oxide represented by the general formula (1a) contains P.

The molar ratio of Li to P(Li/P) is from 0.70 to 1.30 and preferably from 0.80 to 1.20 in terms of atoms in the negative thermal expansion material related to the method for producing the negative thermal expansion material of the second aspect of the present invention, that is, the negative thermal expansion material to be obtained by the method for producing the negative thermal expansion material of the second aspect of the present invention.

The step B1 is a step of mixing the Li source, the Cu source, the V source, and the P source; and the M source to be mixed as needed to prepare the raw material mixture, and uses lithium metaphosphate as the Li source and the P source in the step B1. That is, in the step B1, lithium metaphosphate, the Cu source, and the V source; and the M source to be mixed as needed are mixed to prepare the raw material mixture.

Lithium metaphosphate, represented by $LiPO_3$, is a compound containing Li and P at a molar ratio of Li to P(Li/P) of 1 in terms of atoms. In the method for producing the negative thermal expansion material of the second aspect of the present invention, lithium metaphosphate is used as the Li source and the P source in the step B1, so that the use facilitates obtaining a homogeneous mixture of the Cu source, the V source; the M source to be mixed as needed; and lithium metaphosphate as the raw material mixture.

As long as lithium metaphosphate to be used as the Li source and the P source in the step B1 is industrially available, the lithium metaphosphate is not particularly limited. The lithium metaphosphate has average particle size determined by laser diffraction of 500 μm or less, and preferably 1 to 400 μm in that the reactivity is better.

If the Cu source related to the step B1 is wet-mixed as mentioned below, a Cu source insoluble or sparingly soluble in a solvent for the wet mixing is preferable in that such a Cu source facilitates obtaining a raw material mixture in which the sources are uniformly dispersed, and therefore facilitates obtaining a single-phase copper vanadium composite oxide represented by the general formula (1a) and confirmed by X-ray diffraction. Examples of the Cu source include oxide of copper and hydroxide of copper. Among these Cu sources, determined by laser diffraction, a Cu source having an average particle size (D50) of 20 μm or less is preferable, and a Cu source having an average particle size (D50) of 0.1 to 15 μm is more preferable in that the Cu sources are highly reactive.

If the V source related to the step B1 is wet-mixed as mentioned below, a V source insoluble or sparingly soluble in a solvent for the wet mixing is preferable in that such a V source facilitates obtaining a raw material mixture in which the sources are uniformly dispersed, and therefore facilitates obtaining a single-phase copper vanadium composite oxide represented by the general formula (1a) and confirmed by X-ray diffraction. Examples of the V source include vanadium oxides such as vanadium pentoxide. Among these V sources, determined by laser diffraction, a V source having an average particle size (D50) of 20 μm or less is preferable, and a V source having average particle size (D50) of 0.1 to 15 μm is more preferable in that the V sources are highly reactive.

If the M source related to the step B1 is wet-mixed as mentioned below, an M source insoluble or sparingly soluble in a solvent for the wet mixing is preferable in that such an M source facilitates obtaining a raw material mixture in which the sources are uniformly dispersed, and therefore facilitates obtaining a single-phase copper vanadium composite oxide represented by the general formula (1a) and confirmed by X-ray diffraction. Examples of the M source include oxides and hydroxides containing M. Among these M sources, determined by laser diffraction, an M source having an average particle size (D50) of 20 μm or less is preferable, and an M source having an average particle size (D50) of 0.1 to 15 μm is more preferable in that the M sources are highly reactive.

In the preparation of the raw material mixture related to the step B1, the mixing amounts of lithium metaphosphate, the Cu source and the V source; and the M source to be mixed as needed is preferably adjusted suitably so that the molar ratio between the Cu atoms, the V atoms, the P atoms, and the M atoms in the raw material mixture corresponds to the composition of the copper vanadium composite oxide represented by the above mentioned general formula (1a), and the molar ratio of Li to P(Li/P) in the negative thermal expansion material is from 0.70 to 1.30 and preferably from 0.80 to 1.20 in terms of atoms.

Although lithium metaphosphate, the Cu source, and the V source; and the M source to be mixed as needed can be mixed by the wet process or the dry process, the sources are preferably mixed by the wet process in that the wet process enables obtaining a homogeneous raw material mixture easily. The method for wet-mixing the raw materials is preferably performed using a solvent that does not dissolve lithium metaphosphate, the Cu source, or the V source; or the M source to be mixed as needed or scarcely dissolves the raw materials in that such a solvent facilitates obtaining the raw material mixture in which the raw materials are uniformly dispersed, and therefore facilitates obtaining a single-phase copper vanadium composite oxide represented by the general formula (1a) and confirmed by X-ray diffraction. Although the solvent for the wet mixing varies depending on the types of lithium metaphosphate, the Cu source, and the V source; and the M source to be mixed as needed, examples of the solvent include water, methanol, and ethanol.

Examples of the apparatus for wet-mixing include, but not particularly limited to, media mills such as bead mills, ball mills, paint shakers, attritors, and sand mills. Small amounts of raw materials may be wet-mixed with a mortar in a laboratory.

If dry mixing is performed in the step B1, lithium metaphosphate, the Cu source, and the V source; and the M source to be mixed as needed are dry-mixed to obtain the raw material mixture. If wet mixing is performed in the step B1, lithium metaphosphate, the Cu source, and the V source;

and the M source to be mixed as needed are wet-mixed, followed by drying to obtain the raw material mixture.

The step B2 is a step of firing the raw material mixture prepared in the step B1 to obtain the negative thermal expansion material of the present invention.

The firing temperature in the step B2 is preferably 580 to 780° C. and more preferably 600 to 750° C. It is because, the copper vanadium composite oxide represented by the above-mentioned general formula (1a) tends to be insufficiently produced at a firing temperature of less than 580° C., and the molten product sticking to the crucible tends to make it difficult to collect the product at a firing temperature of more than 780° C.

The firing time in the step B2 is not particularly limited, but the mixture is fired for sufficient time until the negative thermal expansion material of the present invention is produced. The production of the negative thermal expansion material of the present invention can be confirmed for example, by analyzing whether a single-phase copper vanadium composite oxide represented by the general formula (1a) is obtained by X-ray diffraction. In the step B2, almost all the raw material mixture usually become the negative thermal expansion material comprising the copper vanadium composite oxide dissolving the Li atoms and represented by the above-mentioned general formula (1a) within a firing time of 1 hour or more, preferably 2 to 20 hours. In the present invention, "copper vanadium composite oxide represented by the general formula (1a) is single phase" means that the ziesite phase ($\beta$-phase) of the copper vanadium composite oxide represented by the general formula (1a) is present alone, the blossite phase ($\alpha$-phase) is present alone, or the ziesite phase ($\beta$-phase) and the blossite phase ($\alpha$-phase) are present as a mixed phase, and means that other diffraction peaks than the diffraction peaks derived from the copper vanadium composite oxide represented by the general formula (1a) are not detected by X-ray diffraction.

The firing atmosphere in the step B2 is not particularly limited, and the step B2 may be performed in any of an inert gas atmosphere, a vacuum atmosphere, an oxidizing gas atmosphere, and the atmosphere.

In the step B2, the raw material mixture may be fired once or multiple times if desired. For example, the object fired once may be pulverized, and the pulverized object may be further fired for uniforming the powder characteristics.

After the firing, the fired object is suitably cooled; and pulverized, disintegrated, and classified as needed to obtain the negative thermal expansion material of the present invention.

As the method for producing the negative thermal expansion material with a spherical particle shape, for example, the water solvent can be removed from the raw material mixed-solution by spray drying using a spray dryer in the step A2, followed by the step A3 to produce the negative thermal expansion material with the spherical particle shape.

In the spray drying, the size of the sprayed droplets is not particularly limited, but preferably 1 to 40 µm and particularly preferably 5 to 30 µm. The amount of the slurry fed to the spray dryer is preferably determined in light of this viewpoint.

The temperature of hot air for drying from the spray dryer is 100 to 270° C. and preferably 150 to 230° C. due to the prevention of the powder from absorbing moisture and ease of collecting the powder.

The negative thermal expansion materials obtained by the methods for producing the negative thermal expansion material of the first and second aspects of the present invention have average particle sizes of preferably 0.1 to 100 µm and particularly preferably 0.3 to 80 µm based on the observation by scanning electron microscopy. The negative thermal expansion materials have BET specific surface areas of 0.05 to 50 m$^2$/g and particularly preferably 0.1 to 10 m$^2$/g. Such negative thermal expansion materials are preferable in that if the negative thermal expansion materials are used as fillers for resin or glass, the average particle sizes and the BET specific surface areas of the negative thermal expansion materials in the above-mentioned respective ranges facilitate the handle thereof.

The particles of the negative thermal expansion material of the present invention may be surface-treated as needed for improving the dispersibility in resin or the moisture resistance of the negative thermal expansion material. In the methods for producing the negative thermal expansion materials of the first and second aspects of the present invention, the negative thermal expansion material obtained by the firing may be surface-treated as needed for improving the dispersibility in resin or the moisture resistance of the negative thermal expansion material.

Examples of the surface treatment include methods for coating the particle surfaces with silane coupling agents, titanate-based coupling agents, fatty acids or derivatives thereof, and inorganic compounds containing one or more elements selected from Zn, Si, Al, Ba, Ca, Mg, Ti, V, Sn, Co, Fe, and Zr (for example, refer to International Publication Nos. WO 2020/095837, WO 2020/261976, and WO 2019/087722, and Japanese Patent Laid-Open No. 2020-147486). The particles may be suitably surface-treated in combination thereof.

The coefficients of thermal expansion of the negative thermal expansion materials obtained by the methods for producing the negative thermal expansion materials of the first and second aspects of the present invention are $-8.0 \times 10^{-6}$/K or less and preferably $-10.0 \times 10^{-6}$/K or less, and the lower limits thereof are around $-30.0 \times 10^{-6}$/K or more and preferably $-28.0 \times 10^{-6}$/K or more. The coefficient of thermal expansion of the negative thermal expansion material to be obtained by the method for producing the negative thermal expansion material of the present invention is particularly preferably $-25.0 \times 10^{-6}$ to $-8.0 \times 10^{-6}$/K in that the coefficient of the negative thermal expansion material easily offsets the positive expansion upon the combination of the negative thermal expansion material of the present invention with the positive thermal expansion material.

The negative thermal expansion material of the present invention is used as powder or paste. If the negative thermal expansion material of the present invention is used as paste, the negative thermal expansion material of the present invention is mixed and dispersed in a solvent and/or a liquid resin with low viscosity for use as paste. The negative thermal expansion material of the present invention may be used as the paste by dispersing the negative thermal expansion material in a solvent and/or a liquid resin with low viscosity and further optionally adding a binder, a flux material, and a dispersant.

The negative thermal expansion material of the present invention is used in combination with various organic or inorganic compounds as the positive thermal expansion material, and the combination thereof is used as a composite material. The composite material of the present invention comprises the negative thermal expansion material and the positive thermal expansion material of the present invention.

Examples of the organic compounds to be used as the positive thermal expansion material include, but not particularly limited to, rubber, polyolefin, polycycloolefin, polystyrene, ABS, polyacrylates, polyphenylene sulfide, phenolic resin, polyamide resin, polyimide resin, epoxy resin, silicone resin, polycarbonate resin, polyethylene resin, polypropylene resin, polyethylene terephthalate resin (PET resin), and polyvinyl chloride resin. Examples of the inorganic compounds to be used as the positive thermal expansion material include silicon dioxide, silicates, graphite, sapphire, various glass materials, concrete materials, and various ceramic materials.

Since the composite material of the present invention contains the negative thermal expansion material with better negative thermal expansion characteristics, a negative coefficient of thermal expansion, a zero coefficient of thermal expansion, or a low coefficient of thermal expansion can be achieved depending on the ratio of the negative thermal expansion material to another compound.

EXAMPLES

Hereinafter, the present invention will be described by Examples, but is not limited thereto.

Example 1

(Step A1)

A beaker was charged with 3.00 g of ammonium vanadate ($NH_4VO_3$), 6 ml of aqueous ammonia, and 80 ml of pure water, and the mixture was heated to 60° C. with stirring to obtain a solution A. Then, 11.64 g of copper gluconate (available from FUSO CHEMICAL CO., LTD.) was added to 50 ml of pure water, followed by stirring to obtain a solution B. Subsequently, 0.032 g of lithium hydroxide monohydrate was added to 10 ml of pure water, followed by stirring to obtain a solution C. The solution B and the solution C were then added to the solution A sequentially to obtain a raw material-mixed solution as a homogeneous solution.

(Step A2)

The obtained raw material-mixed solution was heated to a temperature that enables keeping the solution boiling with stirring, and water was removed therefrom to obtain a pasty reaction precursor.

(Step A3)

The obtained pasty reaction precursor was fired in a crucible in the atmosphere at 650° C. for 4 hours to obtain a fired article.

In the X-ray diffraction analysis of the obtained fired article, $Cu_{2.00}V_{2.00}O_{7.00}$ with a single phase of the blossite phase, having the main peak at around $2\theta=27°$ was detected. FIG. 1 shows the X-ray diffraction pattern of the fired article. The obtained fired article was acidolyzed to obtain a solution, and the solution was subjected to ICP emission analysis to determine the content of Li atoms in the fired article. The content of Li atoms was 1215 ppm by mass. These results showed that the fired article was a copper vanadium composite oxide as $Cu_{2.00}V_{2.00}O_{7.00}$ with a single phase of the blossite phase dissolving Li atoms at 1215 ppm by mass.

The fired article was then pulverized with a mortar to obtain this as a negative thermal expansion material.

Example 2

(Step A1)

A beaker was charged with 3.00 g of ammonium vanadate ($NH_4VO_3$), 6 ml of aqueous ammonia, and 80 ml of pure water, and the mixture was heated to 60° C. with stirring to obtain a solution A. Then, 12.00 g of copper gluconate (available from FUSO CHEMICAL CO., LTD.) was added to 50 ml of pure water, followed by stirring to obtain a solution B. Subsequently, 0.032 g of lithium hydroxide monohydrate was added to 10 ml of pure water, followed by stirring to obtain a solution C. Next, 0.091 g of phosphoric acid was added to 10 ml of pure water, followed by stirring to obtain a solution D. The solution B, the solution D, and the solution C were then added to the solution A sequentially to obtain a raw material-mixed solution as a homogeneous solution.

(Step A2)

The obtained raw material-mixed solution was heated to a temperature that enables keeping the solution boiling with stirring, and water was removed therefrom to obtain a pasty reaction precursor.

(Step A3)

The pasty reaction precursor was fired in a crucible in the atmosphere at 650° C. for 4 hours to obtain a fired article.

Figure 2:
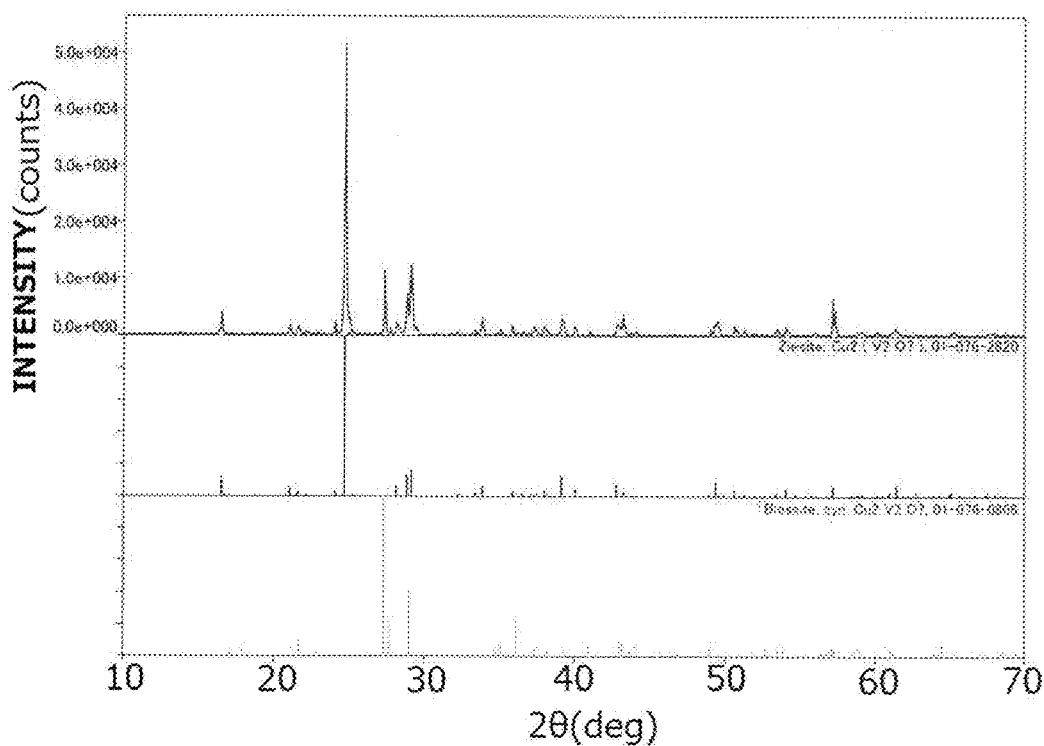
FIG. 2 is the X-ray diffraction pattern of a negative thermal expansion material sample obtained in Example 2.

In the X-ray diffraction analysis of the obtained fired article, $Cu_{2.00}(V_{1.94}P_{0.06})O_{7.00}$ with a single phase of the ziesite phase, having the main peak at around $2\theta=25°$, and the blossite phase, having the main peak at around $2\theta=27°$ were detected. FIG. 2 shows the X-ray diffraction pattern of the fired article. The obtained fired article was acidolyzed to obtain a solution, and the solution was subjected to ICP emission analysis to determine the content of Li atoms in the fired article. The content of Li atoms was 1215 ppm by mass. These results showed that the fired article was a copper vanadium composite oxide as $Cu_{2.00}(V_{1.94}P_{0.06})O_{7.00}$ with a single phase of the ziesite phase and the blossite phase dissolving Li atoms at 1215 ppm by mass. The molar ratio of Li to P(Li/P) in terms of atoms was 0.97.

The fired article was then pulverized with a mortar to obtain this as a negative thermal expansion material.

Example 3

(Step B1)

First, 1.67 g of vanadium pentoxide ($V_2O_5$:average particle size: 1.0 μm), 1.50 g of copper oxide (CuO:average particle size: 1.5 μm), and 0.049 g of lithium metaphosphate ($LiPO_3$:average particle size: 300 μm) were weighed, and pulverized and mixed in 30 ml of ethanol as a dispersion medium with a mortar for 20 minutes, and the mixture was dried to obtain a raw material mixture.

(Step B2)

Figure 3:
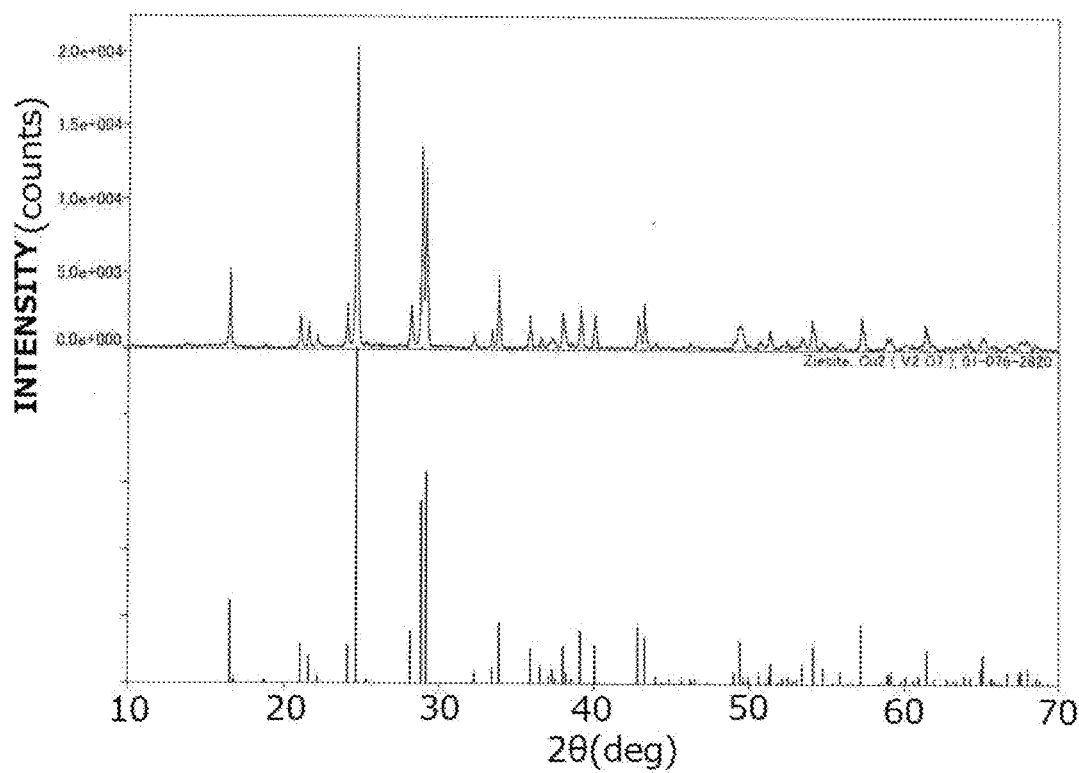
FIG. 3 is the X-ray diffraction pattern of the negative thermal expansion material sample obtained in Example 3.

The obtained raw material mixture was fired in the atmosphere at 650° C. for 4 hours to obtain a fired article. In the X-ray diffraction analysis of the obtained fired article, $Cu_{2.00}(V_{1.94}P_{0.06})O_{7.00}$ with a single phase of the ziesite phase, having the main peak at around $2\theta=25°$ was detected. FIG. 3 shows the X-ray diffraction pattern of the fired article. The obtained fired article was acidolyzed to obtain a solution, and the solution was subjected to ICP emission analysis to determine the content of Li atoms in the fired article. The content of the Li atoms was 1215 ppm by mass. These results showed that the fired article was a copper vanadium composite oxide as $Cu_{2.00}(V_{1.94}P_{0.06})O_{7.00}$ with a single phase of the ziesite phase dissolving Li atoms at 1215 ppm by mass. The molar ratio of Li to P(Li/P) in terms of atoms was 1.00.

The fired article was then pulverized with a mortar to obtain a negative thermal expansion material sample.

Comparative Example 1

First, 1.71 g of vanadium pentoxide ($V_2O_5$:average particle size: 1.0 μm) and 1.50 g of copper oxide (CuO:average particle size: 1.5 μm) were pulverized and mixed in 30 ml of ethanol as a dispersion medium with a mortar for 20 minutes. The mixture was then dried to obtain a raw material mixture. This powder was fired in the atmosphere at 650° C. for 4 hours to obtain a fired article.

Figure 4:
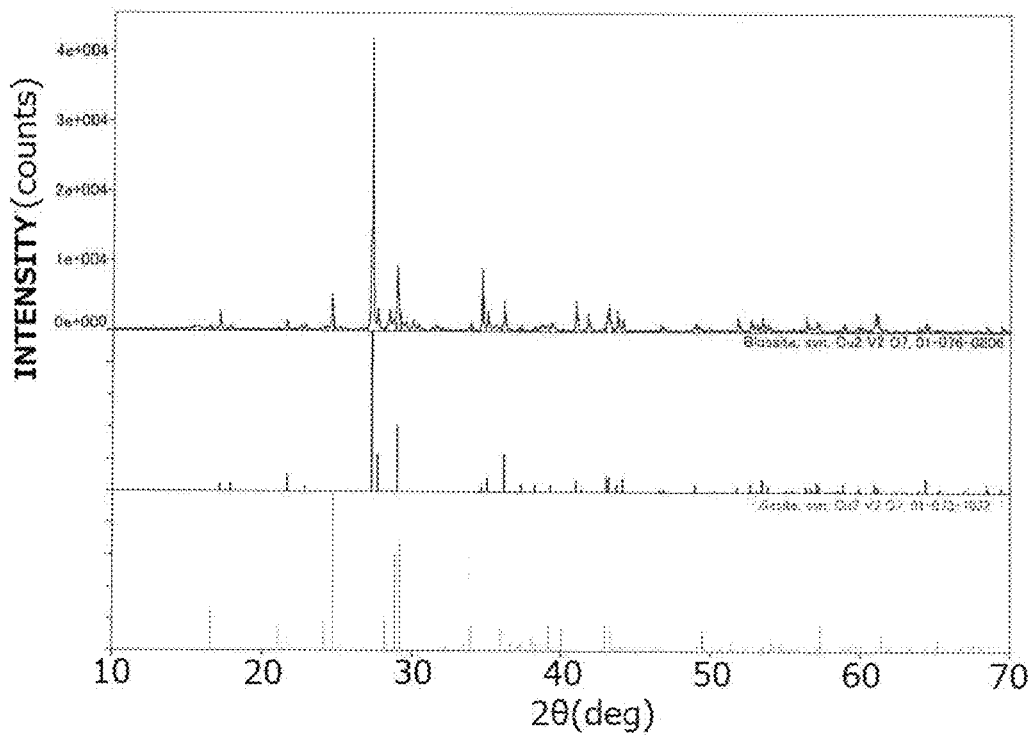
FIG. 4 is the X-ray diffraction pattern of the negative thermal expansion material sample obtained in Comparative Example 1.

In the X-ray diffraction analysis of the obtained fired article, $Cu_{2.00}V_{2.00}O_{7.00}$ with a single phase of the blossite phase having the main diffraction peak at around $2\theta=27°$ was detected. FIG. 4 shows the X-ray diffraction pattern of the fired article.

That is, Comparative Example 1 does not use any Li source, and the obtained copper vanadium composite oxide as $Cu_2V_2O_7$ does not dissolve any Li atoms.

The fired article was then pulverized with a mortar to obtain a negative thermal expansion material sample.

(Physical Properties Evaluation)

The negative thermal expansion material samples obtained in Examples and Comparative Example were measured for average particle size, BET specific surface area, and the coefficient of thermal expansion. The average particle sizes and the coefficients of thermal expansion were measured as follows. Table 1 shows the results thereof.

(Average Particle Size)

Each negative thermal expansion material sample was observed through a scanning electron microscope at a magnification of 1000. The longest diameters of 50 particles randomly sampled from the observation visual field were measured to calculate the arithmetic mean value thereof as the average particle size of the negative thermal expansion material sample.

(Measurement of Coefficient of Thermal Expansion)

<Manufacturing of Molding>

To 1.00 g of a sample was added 0.05 g of propylene carbonate, and the mixture was pulverized and mixed with a mortar for 3 minutes. Then, 0.15 g thereof was weighed, and the whole amount thereof was filled into a metal mold with a diameter of 6 mm and subsequently molded with a hand press at a pressure of 0.5 t to manufacture a powder molding. The temperature of the obtained powder molding was raised to 700° C. over 3 hours and held for 4 hours with an electric furnace to manufacture a ceramic molding.

<Measurement of Coefficient of Thermal Expansion>

The manufactured ceramic molding was measured for the coefficient of thermal expansion with a thermomechanical measuring apparatus (TMA4000SE available from NETZSCH Japan K.K.). The measurement was repeated twice under the measurement conditions of a nitrogen atmosphere, a load of 10 g, and a temperature range of 50 to 425° C. The coefficient of thermal expansion at 50 to 400° C. of the second repeated measurement was defined as the coefficient of thermal expansion of the negative thermal expansion material sample.

TABLE 1

| | Li atom content (ppm by mass) | Average particle size (μm) | BET specific surface area (m$^2$/g) | Coefficient of thermal expansion ($\times 10^{-6}$/K) |
|---|---|---|---|---|
| Example 1 | 1215 | 19 | 0.5 | −11.1 |
| Example 2 | 1215 | 18 | 0.5 | −21.1 |
| Example 3 | 1215 | 20 | 0.4 | −14.1 |
| Comparative Example 1 | 0 | 18 | 0.4 | −2.3 |

The coefficient of thermal expansion at 50 to 300° C. of the negative thermal expansion material of Comparative Example 1 was $-4.4 \times 10^{-6}$/K.

Although Examples 2 and 3 are copper vanadium composite oxides dissolving Li atoms at 1215 ppm and having almost the same composition represented by $Cu_{2.00}(V_{1.94}P_{0.06})O_7$, the copper vanadium composite oxides have different coefficients of thermal expansion as shown in Table 1. Although the reason therefor is unknown, the present inventors believe that it results from the difference in the crystal phase or in the content of the crystal phase, since the copper vanadium composite oxide of Example 2 has two phases, namely the ziesite phase and the blossite phase (refer to also FIG. 2), the copper vanadium composite oxide of Example 3 has a single phase of the ziesite phase (refer to also FIG. 3).

Example 4

(Step A1)

A beaker was charged with 3.00 g of ammonium vanadate (NH$_4$VO$_3$), 6 ml of aqueous ammonia, and 80 ml of pure water, and the mixture was heated to 60° C. with stirring to obtain a solution A. Then, 11.55 g of copper gluconate (available from FUSO CHEMICAL CO., LTD.) was added to 50 ml of pure water, followed by stirring to obtain a solution B. Subsequently, 0.032 g of lithium hydroxide monohydrate was added to 10 ml of pure water, followed by stirring to obtain a solution C. Next, 0.090 g of magnesium hydroxide and 0.6 g of lactic acid were added to 10 ml of pure water, followed by stirring to obtain a solution D. The solution B, the solution D, and the solution C were then added to the solution A sequentially to obtain a raw material-mixed solution as a homogeneous solution.

(Step A2)

The obtained raw material-mixed solution was heated to a temperature that enables keeping the solution boiling with stirring, and water was removed therefrom to obtain a pasty reaction precursor.

(Step A3)

The pasty reaction precursor was fired in a crucible in the atmosphere at 650° C. for 4 hours to obtain a fired article.

In the X-ray diffraction analysis of the obtained fired article, $Cu_{1.99}Mg_{0.12}V_{2.00}O_{7.00}$ with a single phase of the ziesite phase, having the main peak at around $2\theta=25°$ was detected. The obtained fired article was acidolyzed to obtain a solution, and the solution was subjected to ICP emission analysis to determine the content of Li atoms in the fired article. The content of Li atoms was 1215 ppm by mass. These results showed that the fired article was a copper vanadium composite oxide as $Cu_{1.99}Mg_{0.12}V_{2.00}O_{7.00}$ with a single phase of the ziesite phase dissolving Li atoms at 1215 ppm by mass. The fired article was then pulverized with a mortar to obtain this as a negative thermal expansion material.

The average particle size, the BET specific surface area, and the coefficient of thermal expansion were measured in the same way as in Examples 1 to 3. Table 2 shows the results.

TABLE 2

| | Li atom content (ppm by mass) | Average particle size (μm) | BET specific surface area (m²/g) | Coefficient of thermal expansion (× 10⁻⁶/K) |
|---|---|---|---|---|
| Example 4 | 1215 | 19 | 0.4 | −17.4 |

The invention claimed is:

1. A negative thermal expansion material, comprising a copper vanadium composite oxide dissolving Li atoms at a content of 100 to 9000 ppm by mass and represented by the following general formula (1):

$$(Cu_xM_y)(V_aP_b)O_t \tag{1}$$

wherein M represents a metallic element with an atomic number of 11 or more other than Cu and V, $1.60 \leq x \leq 2.40$, $0.00 \leq y \leq 0.40$, $1.60 \leq a \leq 2.40$, $0.00 \leq b \leq 0.40$, $6.20 \leq t \leq 7.80$, $1.60 \leq x+y \leq 2.40$, and $1.60 \leq a+b \leq 2.40$.

2. The negative thermal expansion material according to claim 1, wherein, in the general formula (1), M is one or more selected from Zn, Ga, Fe, Mg, Co, Mn, Al, Ba, and Ca.

3. The negative thermal expansion material according to claim 2, wherein a coefficient of thermal expansion is $-8.0 \times 10^{-6}$/K or less.

4. The negative thermal expansion material according to claim 2, wherein an average particle size is 0.1 to 100 μm.

5. The negative thermal expansion material according to claim 2, wherein BET specific surface area is 0.05 to 50 m²/g.

6. The negative thermal expansion material according to claim 2, wherein, in the general formula (1), $1.60 \leq a \leq 2.40$, $0 \leq b \leq 0.40$, and $1.60 \leq a+b \leq 2.40$.

7. A composite material, comprising the negative thermal expansion material according to claim 2 and a positive thermal expansion material.

8. The negative thermal expansion material according to claim 1, wherein a coefficient of thermal expansion is $-8.0 \times 10^{-6}$/K or less.

9. The composite material according to claim 7, wherein the positive thermal expansion material is at least one selected from metals, alloys, glasses, ceramics, rubbers, and resins.

10. The negative thermal expansion material according to claim 1, wherein an average particle size is 0.1 to 100 μm.

11. The negative thermal expansion material according to claim 1, wherein BET specific surface area is 0.05 to 50 m²/g.

12. The negative thermal expansion material according to claim 1, wherein, in the general formula (1), $1.60 \leq a \leq 2.40$, $0 \leq b \leq 0.40$, and $1.60 \leq a+b \leq 2.40$.

13. A composite material, comprising the negative thermal expansion material according to claim 1 and a positive thermal expansion material.

14. The composite material according to claim 13, wherein the positive thermal expansion material is at least one selected from metals, alloys, glasses, ceramics, rubbers, and resins.

15. A method for producing a negative thermal expansion material, comprising:
   a step A1 of preparing a raw material-mixed solution in which an Li source, a Cu source, and a V source; and an M source and/or a P source to be mixed as needed are dissolved in a water solvent;
   a step A2 of removing the water solvent from the raw material-mixed solution to prepare a reaction precursor; and
   a step A3 of firing the reaction precursor,
   wherein the negative thermal expansion material comprises a copper vanadium composite oxide dissolving Li atoms at a content of 100 to 9000 ppm by mass and represented by the following general formula (1):

$$(Cu_xM_y)(V_aP_b)O_t \tag{1}$$

wherein M represents a metallic element with an atomic number of 11 or more other than Cu and V, $1.60 \leq x \leq 2.40$, $0.00 \leq y \leq 0.40$, $1.60 \leq a \leq 2.40$, $0.00 \leq b \leq 0.40$, $6.20 \leq t \leq 7.80$, $1.60 \leq x+y \leq 2.40$, and $1.60 \leq a+b \leq 2.40$.

16. A method for producing a negative thermal expansion material, comprising:
   a step B1 of mixing an Li source, a Cu source, a V source, and a P source; and an M source to be mixed as needed to prepare a raw material mixture and
   a step B2 of firing the raw material mixture,
   wherein the negative thermal expansion material comprises a copper vanadium composite oxide dissolving Li atoms at a content of 100 to 9000 ppm by mass and represented by the following general formula (1a):

$$(Cu_xM_y)(V_aP_b)O_t \tag{1a}$$

wherein M represents a metallic element with an atomic number of 11 or more other than Cu and V, $1.60 \leq x \leq 2.40$, $0 \leq y \leq 0.40$, $1.60 \leq a \leq 2.40$, $0.00 \leq b \leq 0.40$, $6.20 \leq t \leq 7.80$, $1.60 \leq x+y \leq 2.40$, and $1.60 \leq a+b \leq 2.40$,
   a molar ratio of Li to P(Li/P) in the negative thermal expansion material is from 0.70 to 1.30 in terms of atoms, and
   lithium metaphosphate is used as the Li source and the P source in the step B1.

* * * * *